(12) United States Patent
Evans

(10) Patent No.: US 9,251,093 B2
(45) Date of Patent: Feb. 2, 2016

(54) MANAGING THE TRANSLATION LOOK-ASIDE BUFFER (TLB) OF AN EMULATED MACHINE

(75) Inventor: Matthew L. Evans, London (GB)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 14/117,528

(22) PCT Filed: May 1, 2012

(86) PCT No.: PCT/IB2012/052166
§ 371 (c)(1),
(2), (4) Date: Nov. 13, 2013

(87) PCT Pub. No.: WO2012/156850
PCT Pub. Date: Nov. 22, 2012

(65) Prior Publication Data
US 2014/0237158 A1 Aug. 21, 2014

(30) Foreign Application Priority Data
May 19, 2011 (EP) .................................. 11166761

(51) Int. Cl.
G06F 12/00 (2006.01)
G06F 12/10 (2006.01)
G06F 9/455 (2006.01)

(52) U.S. Cl.
CPC ............ *G06F 12/1027* (2013.01); *G06F 9/455* (2013.01); *G06F 9/45533* (2013.01); *G06F 12/1009* (2013.01); *G06F 2212/684* (2013.01)

(58) Field of Classification Search
CPC ... G06F 12/1027; G06F 12/12; G06F 12/121; G06F 2212/68; G06F 2212/681; G06F 2212/683; G06F 2212/684; G06F 2212/69; G06F 9/455; G06F 9/45533
See application file for complete search history.

(56) References Cited

U.S. PATENT DOCUMENTS

| 2004/0054515 A1* | 3/2004 | Todi et al. ...................... 703/22 |
| 2006/0230252 A1* | 10/2006 | Dombrowski et al. ....... 711/205 |
| 2006/0271919 A1 | 11/2006 | Moyer |
| 2008/0301364 A1 | 12/2008 | Lauterbach et al. |
| 2010/0100685 A1 | 4/2010 | Kurosawa et al. |

* cited by examiner

*Primary Examiner* — Shawn X Gu
(74) *Attorney, Agent, or Firm* — Stephen R. Tkacs; Stephen J. Walder, Jr.; Parashos T. Kalaitzis

(57) ABSTRACT

A mechanism is provided for managing the translation look-aside buffer (TLB) of an emulated computer, in which an extension to the TLB is provided so as to improve virtual address translation capacity for the emulated central processing unit (CPU).

18 Claims, 6 Drawing Sheets

MANAGING THE TRANSLATION LOOK-ASIDE BUFFER (TLB) OF AN EMULATED MACHINE

BACKGROUND

The present invention relates to a mechanism for managing the translation look-aside buffer (TLB) of an emulated machine.

Computers comprise a processor or central processing unit (CPU) that carries out the instructions of a computer program and is the primary element performing the function of the computer CPUs are generally associated with memory, commonly in the form of random access memory (RAM), for storing data used in the processing of the instruction by the CPU. The RAM may be addressed using virtual addressing, with the translation between virtual and real addresses commonly being managed by a memory management unit (MMU) associated with the CPU. A page table is maintained by the MMU, which comprises the translations of the virtual address space to the corresponding physical address space.

A virtual address space may be very large and searching it for a given translation may be computationally expensive or time consuming. Thus, in order to speed up virtual address translation, the MMU is arranged to maintain a specialised cache in the form of a translation look-aside buffer (TLB). The TLB is used to hold a set of entries comprising the most recently used translations between the virtual address space and the physical address space. A TLB is commonly implemented as content addressable memory (CAM). Thus, the CAM search key is a virtual address and the search result is the corresponding physical address. If the TLB is searched and the given virtual address cannot be found, the MMU proceeds to locate the virtual address in the page table. Once located, and the translation returned to the MMU, the located virtual to physical address mapping is entered in the TLB.

A problem arises when a computer is emulated, for example, where the function of a given computer or machine is synthesised by a software system. In an emulated CPU, the computational cost of a virtual address translation is commonly proportionally higher than on a non-emulated CPU. Furthermore, if changes are made in the emulated hardware, some operating systems that are designed to run on the relevant CPU may no longer run as expected or processing errors may result.

SUMMARY

An embodiment of the invention provides a method for managing the translation look-aside buffer (TLB) of an emulated machine, the method comprising the step of emulating a machine, the emulation comprising a CPU and a translation look-aside buffer (TLB); defining storage means arranged to provide an extension to the emulated TLB; in response to the displacement of an entry from the TLB, storing the displaced entry in the storage means; in response to a search of the TLB failing to locate a requested TLB entry, searching the storage means for the entry; and returning the result of the search of the storage means.

The method may comprise the further step of: in response to the search of the storage means failing to locate the requested TLB entry, returning a search result indicating that the search of the TLB failed to locate the requested TLB entry. The method may comprise the further steps of: in response to the search of the storage means locating the requested TLB entry, inserting the located entry from the storage means into the TLB; and returning a search result as the inserted TLB entry.

Another embodiment provides apparatus for managing the translation look-aside buffer (TLB) of an emulated machine, the apparatus being operable to emulate a machine, the emulation comprising a CPU and a translation look-aside buffer (TLB); define storage means arranged to provide an extension to the emulated TLB; in response to the displacement of an entry from the TLB, store the displaced entry in the storage means; search the storage means for the entry in response to a search of the TLB failing to locate a requested TLB entry; and return the result of the search of the storage means.

A further embodiment provides a computer program stored on a computer readable medium and loadable into the internal memory of a computer, comprising software code portions arranged, when the program is run on a computer, for performing a method for managing the translation look-aside buffer (TLB) of an emulated machine, the method comprising the step of emulating a machine, the emulation comprising a CPU and a translation look-aside buffer (TLB); defining storage means arranged to provide an extension to the emulated TLB; in response to the displacement of an entry from the TLB, storing the displaced entry in the storage means; in response to a search of the TLB failing to locate a requested TLB entry, searching the storage means for the entry; and returning the result of the search of the storage means.

BRIEF DESCRIPTION OF THE SEVERAL VIEWS OF THE DRAWINGS

Embodiments of the invention will now be described, by way of example only, with reference to the accompanying drawings in which.

DETAILED DESCRIPTION

Figure 1:
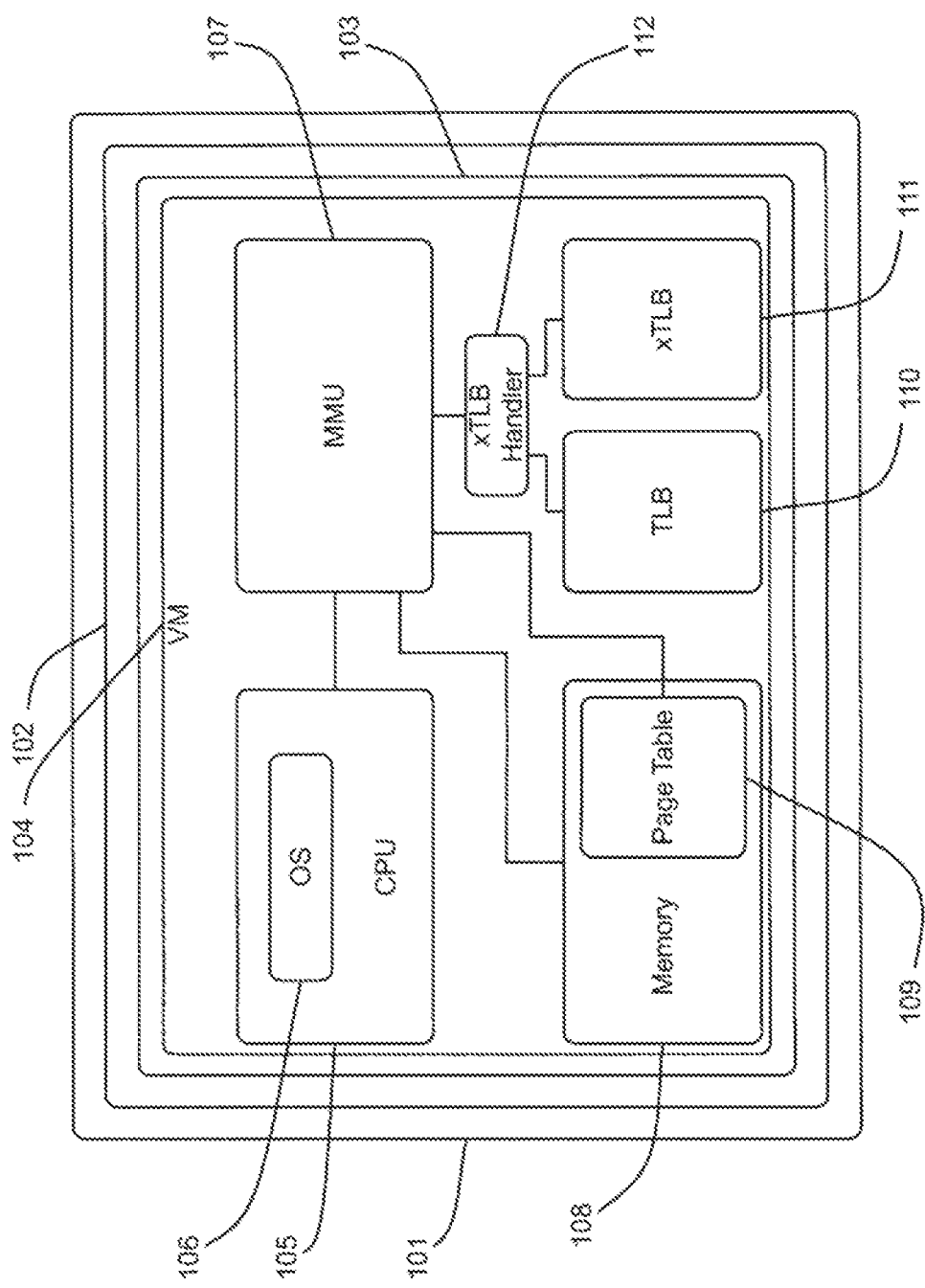
FIG. 1 is a schematic illustration of a computer system emulating a computer.

With reference to FIG. 1, a computer 101 is loaded with an operating system 102, which provides a platform for one or more application programs. In the present embodiment, the computer is arranged to run a virtual machine processing environment application program 103 arranged to emulate the processing of a selected machine or processor on the computer 101. The emulated machine 104 comprises a central processing unit (CPU) 105, which is arranged to run an operating system (OS) 106. In the present embodiment, the OS 106 is a version of Linux and the emulated CPU 105 is a MIPS™ (Microprocessor without Interlocked Pipeline Stages) CPU produced by MIPS Technologies™ Inc.

The emulated machine 104 further comprises a memory management unit (MMU) 107 and memory 108, in the form of random access memory (RAM) for storing data used in the processing of the instruction by the CPU 105. The memory 108 is addressed using virtual addressing, with the translation between virtual and real addresses being managed by the MMU 107. A page table 109 is maintained by the MMU 107, which comprises the translations of the virtual address space to the corresponding physical address space. The virtual machine 104 further comprises a translation look-aside buffer (TLB) 110 maintained by the MMU 107 and arranged to hold a set of entries comprising the most recently used translations between the virtual address space and the physical address space. In the present embodiment, the TLB 110 comprises content addressable memory (CAM).

In the present embodiment, the emulated machine 104 further comprises storage means in the form of an extended TLB (xTLB) 111, which is arranged to provide an extension to the main TLB 110. An xTLB handler module 112 is provided and arranged to managed the contents of the xTLB appropriately as described below. The xTLB 111 is arranged to provide additional TLB capacity that enables the MMU 107 to cache a greater number of regularly used virtual address translations and thus minimise the computationally expensive look-up of addresses via the page table 109. Such look-up of the page table 109 is commonly referred to as page table walk.

The xTLB handler 112 is arranged to monitor the activity of the CPU 105 and the MMU 107 in relation to the TLB 110 and to maintain the xTLB 111 accordingly. The xTLB handler 112 is arranged to detect the displacement of entries from the TLB 110 and add each displaced entry, which is not an invalid translation, to the xILB 111. In response to the search of the TLB 110 by the MMU 107 for a given entry, the xTLB handler 112 is arranged to also search the xTLB 111 for the same entry and, if found in the xTLB 111, to swap the entry into the TLB 110. The XTLB handler 112 then returns the swapped-in matched entry in the TLB 110 to the MMU 107 as the result of the virtual address translation search.

The MIPS™ CPU 105 provides the Linux OS 106 with direct access to the TLB 110. In this situation, if the xTLB 111 contains a given mapping, but the OS 106 reads all entries of the TLB 110, confusion may result as a mapping exists but not in the read set. Thus in the present embodiment, the xTLB handler 112 is arranged to detect when the CPU 105 is reading the TLB 110 and, in response, flush the xTLB 111 leaving just the original entries in the TLB 110 as described further below with reference to FIG. 4. This way, the CPU 105 reads the true set of valid TLB entries.

The xTLB handler 112 is also arranged to detect the flushing of a single address by the MMU 107. Such single address flushing is indicated, in the Linux/MIPS™ environment, by the use of a probe operation to identify the location in the TLB 110 of a given virtual address translation. In response to such a probe operation on the TLB 110 for a given entry, the xTLB handler 112 is arranged to also probe the xTLB 111 for the same entry and, if found in the xTLB 111, to swap that entry into the TLB 110. The xTLB handler 112 then returns the swapped-in matched address location in the TLB 110 to the MMU 107 as the result of the probe operation. The CPU 105 will then flush the identified entry by writing an invalid entry to the same location in the TLB 110.

The xTLB handler 112 is also arranged to flush the xTLB 111 in response to the complete flushing of the TLB 110. In the present embodiment, the flushing of the TLB is indicated by the MMU 107 writing invalid entries to each entry of the TLB 110. When the xTLB handler 112 detects this CPU behaviour, the xTLB handler 112 is arranged to also flush the xTLB 111. The MMU 107 is provided with the facility to lock TLB entries. Such locked TLB entries are never flushed or displaced by newly inserted TLB entries. In the present embodiment, the xTLB handler 112 provides the same facility of locked entries in the xTLB 111.

As noted above, in certain circumstances the xTLB handler 112 is arranged to displace, swap or otherwise replace an entry in the TLB 110 or xTLB 111. The selection of the candidate entry to be displaced, swapped or otherwise replaced is selected by the xTLB handler 112 in accordance with a predetermined protocol. In the present embodiment, the predetermined protocol is random selection.

Figure 2:
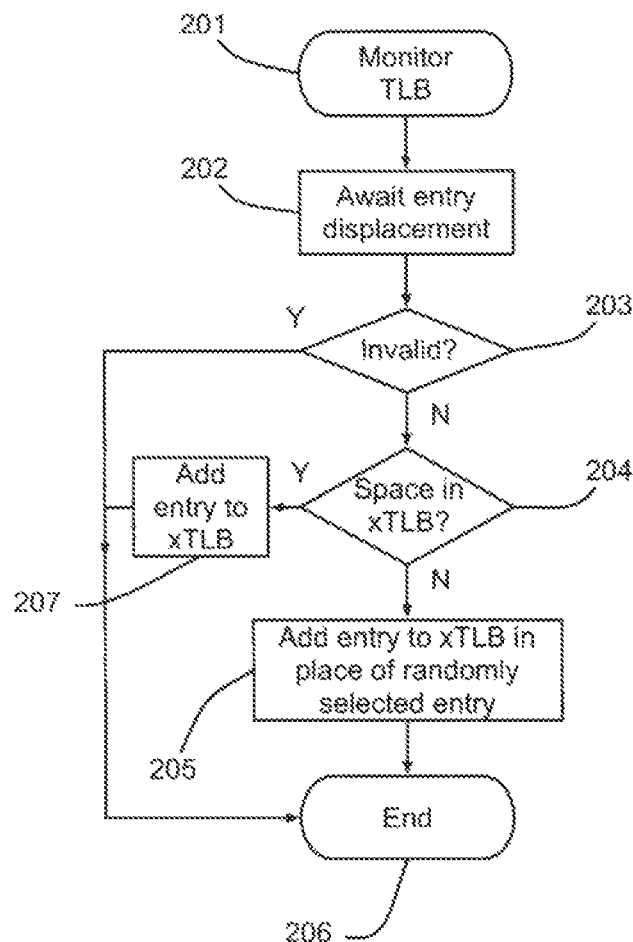
FIGS. 2 to 6 are flow charts illustrating processing performed when managing the translation look-aside buffer (TLB) of the emulated CPU of FIG. 1.

The processing performed by the xTLB handler 112 when monitoring the TLB 110 will now be described in further detail with reference to the flow chart of FIG. 2. Processing is initiated at step 201 on start-up of the CPU 105 and processing then moves to step 202. At step 202 the displacement of an entry from the TLB 110 is awaited and once received processing moves to step 203. At step 203 the entry is inspected to determine whether or not it is an invalid virtual address translation and if not processing moves to step 204. At step 204 if no free space is available in the xTLB 111 then processing moves to step 205. At step 205 the entry is added to the xTLB 111 in place of a randomly selected entry and processing moves to step 206 and ends. If at step 203 the displaced entry is an invalid virtual address translation then processing moves directly to step 206 and ends. If at step 204 free space is available in the xTLB 111 then processing moves to step 207 where the entry is added to the xTLB 111 and processing moves to step 206 and ends.

Figure 3:
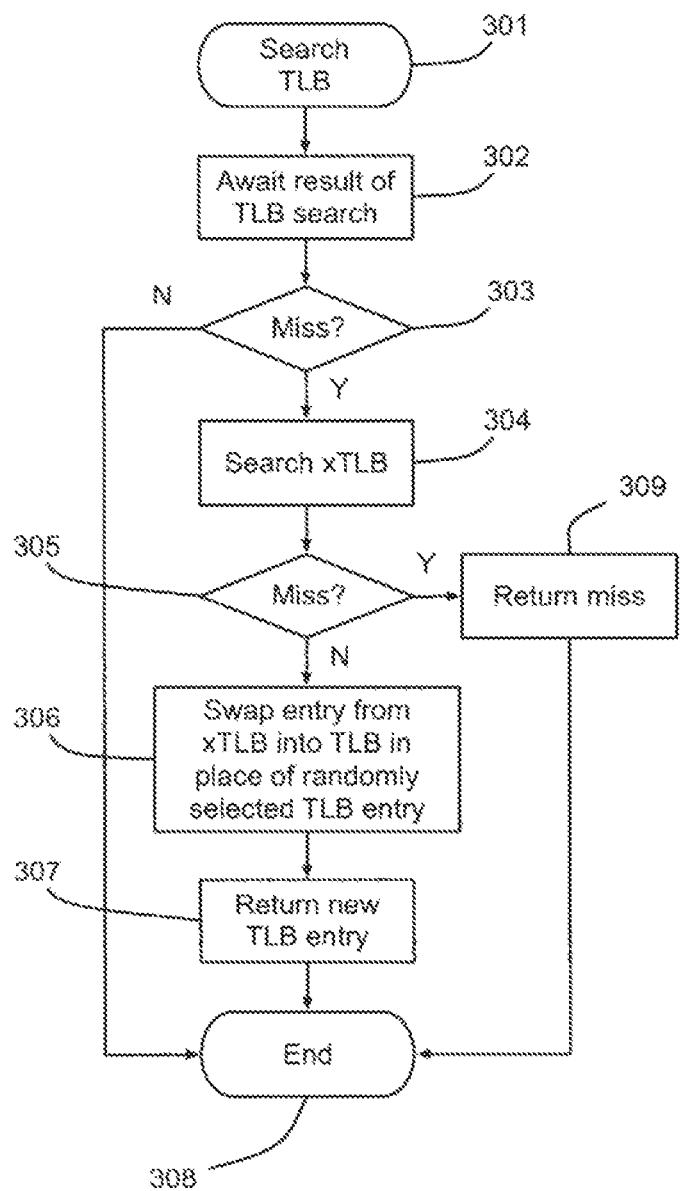

The processing performed by the xTLB handler 112 in response to a search of the TLB 110 will now be described in further detail with reference to the flow chart of FIG. 3. Processing is initiated at step 301 in response to the detection of a search operation by the MMU 107 on the TLB 110 for a virtual address translation and processing then moves to step 302. At step 302 processing awaits the result of the search of the TLB 110 and once received moves to step 303. At step 303 if the result of the search is a miss processing moves to step 304. At step 304 the same search is conducted in the xTLB 111 and processing moves to step 305. At step 305 if the result of the search of the xTLB 111 produces a hit then processing moves to step 306. At step 306 the located entry in the xTLB is swapped with a randomly selected entry in the TLB 110 and processing moves to step 307. At step 307 the swapped-in entry in the TLB 110 is returned to the MMU 107 as the result of the original search of the TLB 110. Processing then moves to step 308 and ends. If at step 303 the original search of the TLB 110 provides a hit then this result is returned to the MMU 107 as normal and processing moves to step 308 and ends. If at step 305 the search of the xTLB 111 produces a miss then processing moves to step 309. At step 309 a miss is returned to the MMU 107 as the result of the original search of the TLB 110 and processing moves to step 308 and ends.

Figure 4:
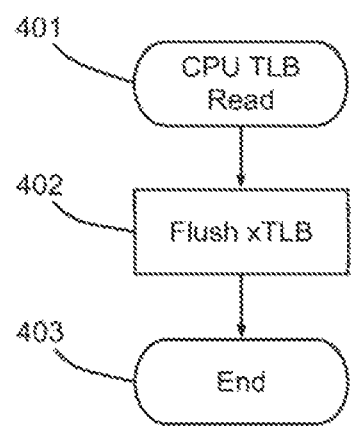

The processing performed by the xTLB handler 112 in response to a direct read of the TLB by the CPU 105 will now be described in further detail with reference to the flow chart of FIG. 4. Processing is initiated at step 401 in response to the detection of a read operation by the CPU on the TLB 110 and processing then moves to step 402. At step 402 the xTLB is flushed and processing moves to step 403 and ends.

Figure 5:
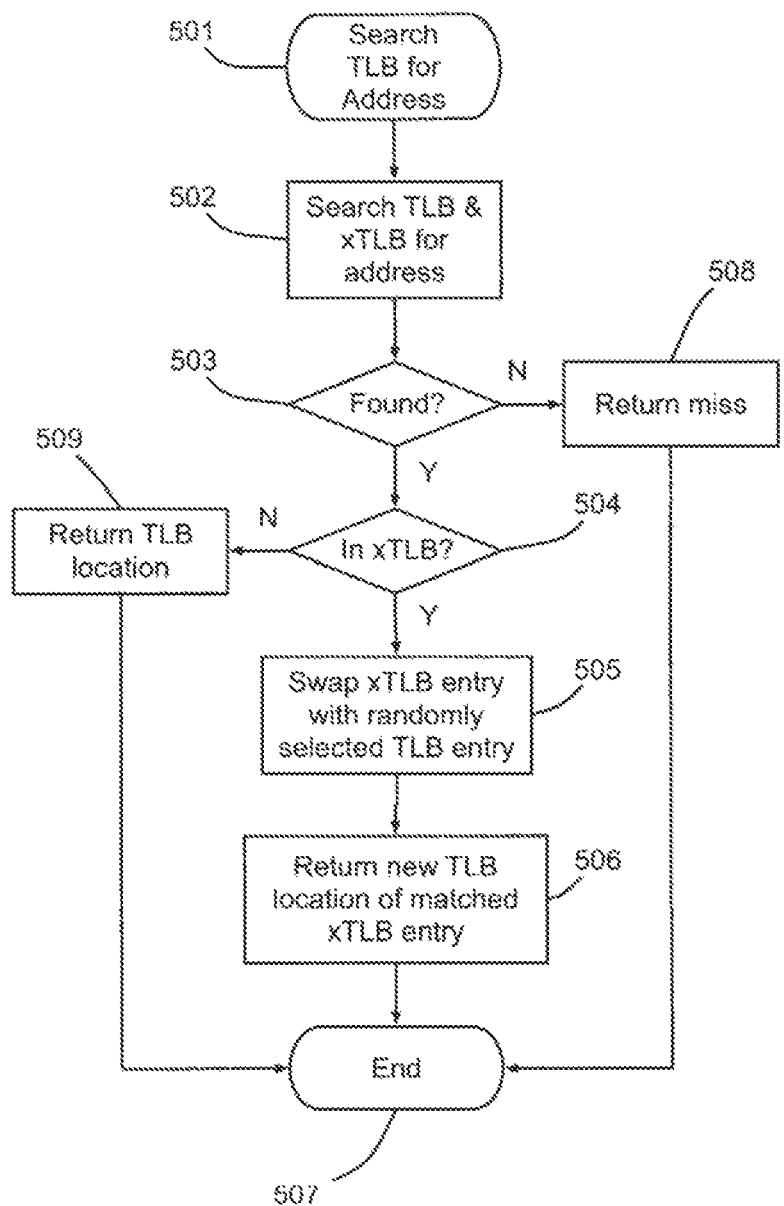

The processing performed by the xTLB handler 112 in response to the flushing of a specific address from the TLB 110 will now be described in further detail with reference to the flow chart of FIG. 5. Processing is initiated at step 501 in response to the detection of a probe operation by the CPU 105 on the TLB 110 to identify the location in the TLB 110 of a specified virtual address translation and processing then moves to step 502. At step 502 both the TLB 110 and the xTLB are searched for the given virtual address translation and processing moves to step 503. At step 503 if the search produced a hit then processing moves to step 504. At step 504 if the hit was located in the xTLB 111 then processing moves to step 505. At step 505 the located entry in the xTLB 111 is swapped with a randomly selected entry in the TLB 110 and processing moves to step 506. At step 506 the location of the newly swapped-in TLB entry is returned as the result of the probe operation and processing moves to step 507 and ends. If at step 503 if the search produced a miss then processing moves to step 508 where the miss is returned as the result of the probe operation and processing moves to step 507 and ends. If at step 504 the hit was located in the TLB 110 then processing moves to step 509. At step 509 the location of the matched TLB entry is returned as the result of the probe operation and processing moves to step 507 and ends.

Figure 6:
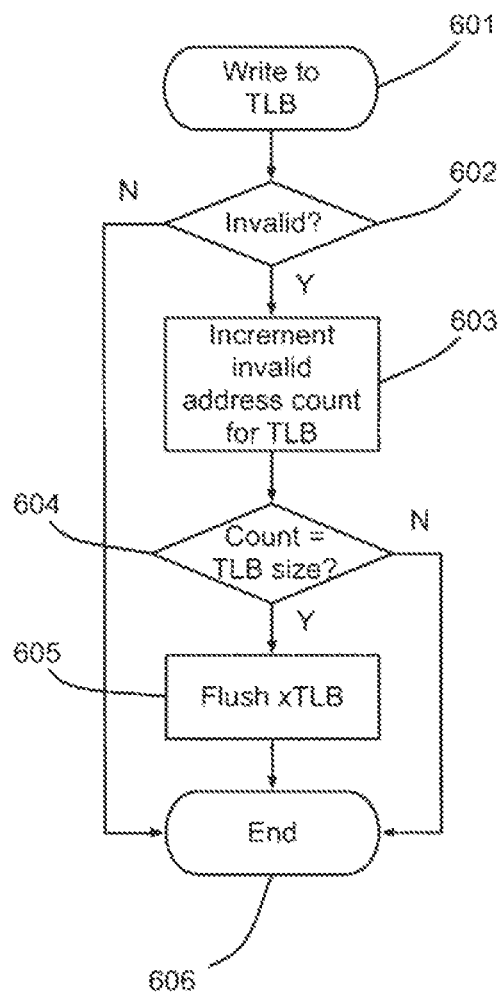

The processing performed by the xTLB handler 112 in response to the flushing of the whole TLB 110 will now be described in further detail with reference to the flow chart of FIG. 6. Processing is initiated at step 601 in response to the detection of a write operation by the CPU 105 on the TLB 110 and processing then moves to step 602. At step 602 the written entry is inspected to determine if it comprises an invalid virtual address translation and if so processing moves to step 603. At step 603 a variable comprising a count of invalid entries in the TLB 110 is incremented by one and processing moves to step 604. At step 604 the value of the variable is compared to the size of the TLB 110, that is, to the maximum number of entries provided by the TLB 110, and if the two are equal, indicating an effective flush operation performed in the TLB 110 then processing moves to step 605. At step 605 the xTLB 111 is flushed and processing moves to step 606 and ends. If at step 602 the written entry is not invalid then processing moves directly to step 606 and ends. If at step 604 the variable is less than the maximum number of entries provided by the TLB 110 then processing moves to step 606 and ends.

In another embodiment, the emulated processor is provided with a dedicated flush operation arranged to flush the whole TLB. In this embodiment, the xTLB handler is arranged, on detection of a flush TLB operation, to also flush the whole of the xTLB.

In a further embodiment, the emulated processor is provided with a dedicated individual entry flush operation arranged to flush a single entry from the TLB. In this embodiment, the xTLB handler is arranged, on detection of an entry flush operation on the TLB, to also search the xTLB for the relevant address and, if found, flush it from the xTLB.

As will be appreciated by those skilled in the art, the predetermined protocol employed by the xTLB handler for selecting a candidate entry to be displaced, swapped or otherwise replaced may be any suitable candidate selection protocol.

Embodiments of the invention enable the extension of the emulated TLB so as to improve emulation performance by reducing TLB miss rates. Furthermore, embodiment of the invention enable such TLB extension do be performed without any apparent change to the emulated CPU from the point of view of the resident OS thus reducing the possibility of the OS performing incorrectly.

As will be understood by those skilled in the art, the terms emulated CPU, emulated processor, virtual CPU or virtual processor are commonly used to refer to an emulation or virtualisation of a given computer or machine. Accordingly, the terms emulated machine or computer used herein is intended to be construed broadly so as to comprise the terms emulated CPU, emulated processor, virtual CPU or virtual processor.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. A method for managing a translation look-aside buffer (TLB) of an emulated machine, the method comprising:
    emulating a machine, the emulation comprising an emulated processor and an emulated translation look-aside buffer (TLB);
    defining an extended TLB storage arranged to provide an extension to the emulated TLB;
    in response to displacement of an entry from the emulated TLB, storing the displaced entry in the extended TLB storage;
    in response to a search of the emulated TLB failing to locate a requested TLB entry, searching the extended TLB storage for the requested TLB entry;
    returning a result of the search of the extended TLB storage;
    monitoring a number of invalid entries in the emulated TLB; and
    if the number of invalid entries equals a number of total non-locked entries in the emulated TLB, then flushing the extended TLB storage.

2. A method according to claim 1, further comprising:
    in response to the search of the extended TLB storage failing to locate the requested TLB entry, returning a search result indicating that the search of the emulated TLB failed to locate the requested TLB entry.

3. A method according to claim 1, further comprising:
    in response to the search of the extended TLB storage locating the requested TLB entry, inserting the located entry from the extended TLB storage into the emulated TLB; and
    returning a search result as the inserted TLB entry.

4. A method according to claim 3, wherein the located entry in the extended TLB storage is swapped with an entry in the emulated TLB.

5. A method according to claim 1, wherein the search is received from a memory management unit (MMU) for the emulated machine.

6. A method according to claim 1, wherein the displaced entry is only stored in the extended TLB storage if the displaced entry comprises a valid entry.

7. A method according to claim 1, wherein if no free space is available in the extended TLB storage for insertion of a new entry then the new entry is inserted in place of an existing entry selected in accordance with a predetermined protocol.

8. A method according to claim 7 in which said predetermined protocol is random selection.

9. A method according to claim 1, further comprising:
    flushing the extended TLB storage in response to flushing of the emulated TLB.

10. A method according to claim 1, further comprising:
 flushing the extended TLB storage in response to the emulated processor reading the emulated TLB.

11. Apparatus for managing a translation look-aside (TLB) of an emulated machine, the apparatus comprising:
 a processor; and
 a memory coupled to the processor, wherein the memory comprises instructions which cause the processor to:
 emulate a machine, the emulation comprising an emulated processor and an emulated translation look-aside buffer (TLB);
 define an extended TLB storage arranged to provide an extension to the emulated TLB;
 in response to displacement of an entry from the emulated TLB, store the displaced entry in the extended TLB storage;
 search the extended TLB storage for the entry in response to a search of the emulated TLB failing to locate a requested TLB entry;
 return a result of the search of the extended TLB storage;
 monitor a number of invalid entries in the emulated TLB; and
 flush the extended TLB storage if the number of invalid entries equals a number of total non-locked entries in the emulated TLB.

12. Apparatus according to claim 11, wherein the instructions further cause the processor to:
 return a search result indicating that the search of the emulated TLB failed to locate the requested TLB entry in response to the search of the extended TLB storage failing to locate the requested TLB entry.

13. Apparatus according to claim wherein the instructions further cause the processor to:
 inert an entry from the extended TLB storage into the emulated TLB in response to the search of the extended TLB storage locating the requested TLB entry; and
 return a search result as the inserted TLB entry.

14. Apparatus according to claim 11, wherein the search is received from a memory management unit (MMU) for the emulated machine.

15. Apparatus according to claim 11, wherein if no free space is available in the extended TLB storage for insertion of a new entry then the new entry is inserted in place of an existing entry selected in accordance with a predetermined protocol.

16. Apparatus according to claim 11, wherein the instructions further cause the processor to:
 flush the extended TLB storage in response to flushing of the emulated TLB.

17. Apparatus according to claim 11, wherein the instructions further cause the processor to:
 flush the extended TLB storage in response to the emulated processor reading the emulated TLB.

18. A computer program stored on a non-transitory computer readable storage medium and loadable into an internal memory of a computer, comprising software code, when executed on the computer, causes the computer to:
 emulate a machine, the emulation comprising an emulated processor and an emulated translation look-aside buffer (TLB);
 define an extended TLB storage arranged to provide an extension to the emulated TLB;
 in response to displacement of an entry from the emulated TLB, store the displaced entry in the extended TLB storage;
 search the extended TLB storage for the entry in response to a search of the emulated TLB failing to locate a requested TLB entry;
 return a result of the search of the extended TLB storage;
 monitor a number of invalid entries in the emulated TLB; and
 flush the extended TLB storage if the number of invalid entries equals a number of total non-locked entries in the emulated TLB.

\* \* \* \* \*